(12) United States Patent
Sivinski

(10) Patent No.: US 11,337,357 B2
(45) Date of Patent: May 24, 2022

(54) AGRICULTURAL STACKER TOOL BAR

(71) Applicant: Harvest International, Inc., Storm Lake, IA (US)

(72) Inventor: Jeffrey Alan Sivinski, Cherokee, IA (US)

(73) Assignee: Harvest International, Inc., Storm Lake, IA (US)

( * ) Notice: Subject to any disclaimer, the term of this patent is extended or adjusted under 35 U.S.C. 154(b) by 316 days.

(21) Appl. No.: 16/123,285

(22) Filed: Sep. 6, 2018

(65) Prior Publication Data

US 2019/0075707 A1    Mar. 14, 2019

Related U.S. Application Data

(60) Provisional application No. 62/556,138, filed on Sep. 8, 2017.

(51) Int. Cl.
  *A01B 73/04*   (2006.01)
  *A01B 63/10*   (2006.01)
  *A01C 7/20*    (2006.01)

(52) U.S. Cl.
  CPC ............ *A01B 73/044* (2013.01); *A01B 63/10* (2013.01); *A01B 73/046* (2013.01); *A01C 7/208* (2013.01)

(58) Field of Classification Search
  CPC ..... A01B 73/04; A01B 73/044; A01B 73/046; A01B 63/10; A01C 7/208; A01M 7/0075
  See application file for complete search history.

(56) References Cited

U.S. PATENT DOCUMENTS

| | | | |
|---|---|---|---|
| 2,221,769 A | 11/1940 | Hipple | |
| 3,866,688 A * | 2/1975 | Hansen | A01B 73/044 172/311 |
| 4,046,203 A * | 9/1977 | Ward | A01B 73/044 172/456 |
| 4,074,766 A * | 2/1978 | Orthman | A01B 73/04 172/311 |
| 4,133,391 A * | 1/1979 | Richardson | A01B 73/046 172/1 |
| 4,646,851 A | 3/1987 | Duello | |
| 4,821,807 A | 4/1989 | Trumm | |
| 5,540,290 A * | 7/1996 | Peterson | A01B 73/044 172/311 |
| 5,921,325 A * | 7/1999 | Meek | A01B 73/044 111/52 |
| 5,974,986 A | 11/1999 | Trisler | |
| 6,003,615 A * | 12/1999 | Moore | A01B 73/044 172/311 |
| 6,675,907 B2 | 1/2004 | Moser et al. | |

(Continued)

*Primary Examiner* — Jessica H Lutz
(74) *Attorney, Agent, or Firm* — McKee, Voorhees & Sease, PLC

(57) ABSTRACT

An agricultural tool bar has outer wings foldable between a lowered use or field position and a raised transport position. A primary pair of hydraulic cylinders fold and unfold the wings, while a secondary pair of hydraulic cylinders initially incline the wings from the horizontal use position before folding to the transport position. The secondary set of cylinders allow the tool bar to be used for narrow row planting without interference from seed boxes mounted on the toolbar center frame and the wings. The primary cylinders extend to push the wings to the transport position and retract to pull the wings to the use position.

5 Claims, 14 Drawing Sheets

(56) References Cited

U.S. PATENT DOCUMENTS

| | | | |
|---|---|---|---|
| 7,073,604 B1* | 7/2006 | Dobson | A01B 63/32 |
| | | | 111/57 |
| 9,161,488 B2 | 10/2015 | Blunier | |
| 9,848,526 B2 | 12/2017 | Gadzella et al. | |
| 2002/0017389 A1* | 2/2002 | Moser | A01B 63/32 |
| | | | 172/311 |
| 2007/0113764 A1* | 5/2007 | Audette | A01C 7/042 |
| | | | 111/170 |
| 2014/0060861 A1 | 3/2014 | Blunier | |
| 2014/0060866 A1 | 3/2014 | Blunier et al. | |
| 2014/0060868 A1* | 3/2014 | Blunier | A01B 73/044 |
| | | | 172/311 |
| 2015/0245556 A1* | 9/2015 | Prickel | A01C 7/208 |
| | | | 701/50 |
| 2017/0258000 A1* | 9/2017 | Harnetiaux | A01B 63/008 |
| 2018/0220576 A1* | 8/2018 | Blackwell | A01B 73/044 |
| 2019/0021212 A1* | 1/2019 | Boriack | A01B 73/044 |
| 2020/0053950 A1* | 2/2020 | Limaye | A01B 73/046 |
| 2020/0107489 A1* | 4/2020 | Hiedeman | A01B 73/00 |

\* cited by examiner

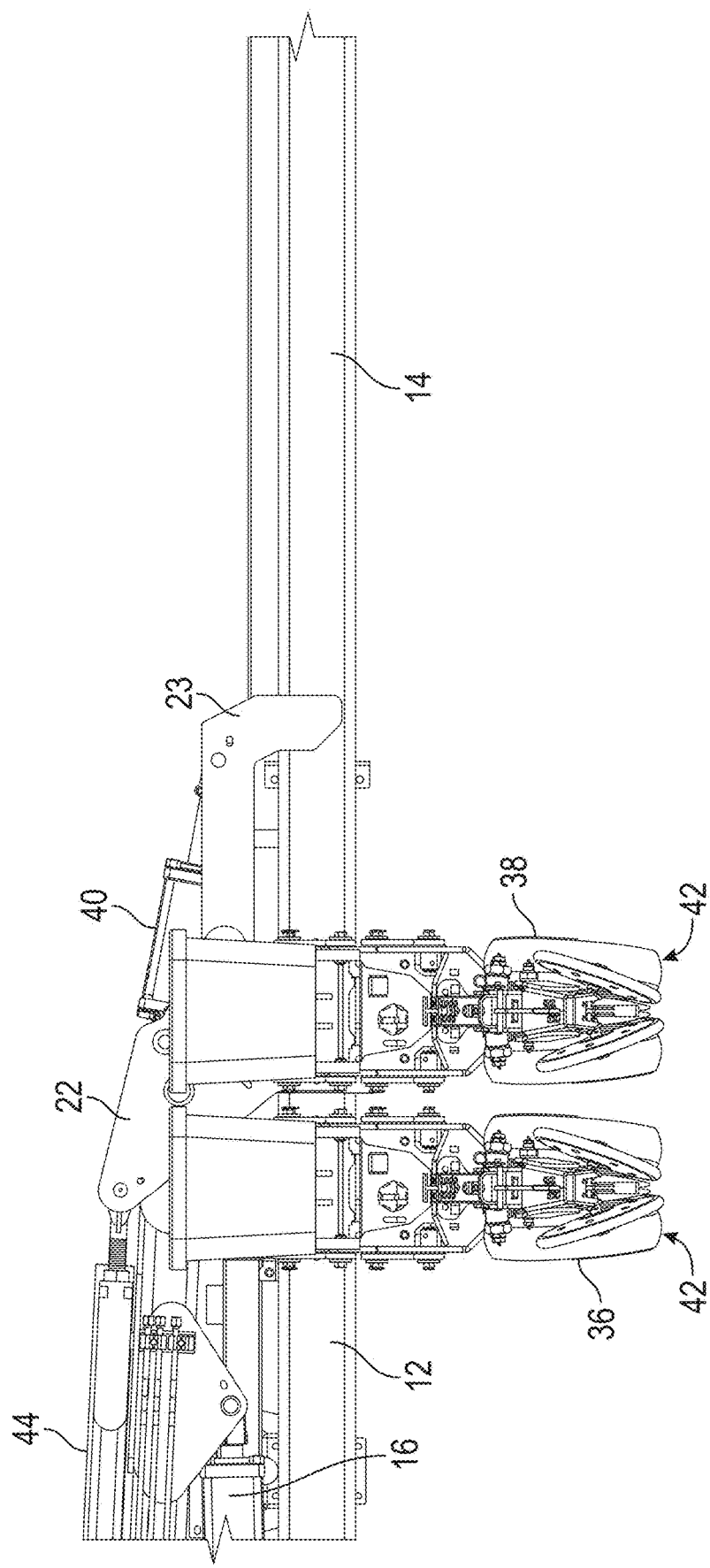

AGRICULTURAL STACKER TOOL BAR

CROSS-REFERENCE TO RELATED APPLICATIONS

This claims priority to Provisional application U.S. Ser. No. 62/556,138, filed on Sep. 8, 2017, which herein incorporated by reference in its entirety.

FIELD OF THE INVENTION

The invention is directed toward an agricultural tool bar having outer wings which are foldable between a raised horizontal transport position and a lowered substantially horizontal use or field position. The wings are folded and unfolded by first and second pairs of hydraulic cylinders which allow the tool bar to be utilized for narrow row planting.

BACKGROUND OF THE INVENTIONS

Agricultural tool bars having folding wings have been used for several decades for row crop planting. The tool bar generally includes a center frame assembly, with left and right wings pivotally attached to the outer ends of the center frame assembly. The wings are moved by hydraulic cylinders between a lowered, substantially horizontal field use position and a raised transport position. The hydraulic cylinders take up valuable space on the tool bar. While hydraulic cylinders have greater strength pushing than pulling, conventional tool bar assemblies pull the wings from the use position to the transport position, thus requiring heavier duty hydraulic cylinders with greater lift capacity. Also, the conventional hydraulic cylinders used for folding the wings and the interconnecting arms are normally horizontally oriented, with no mechanical advantages gained from alternative configurations.

Some tool bars also allow the wings to float so as to follow uneven ground surfaces. However, these prior art floating wings do not have any controls which allow the wing to also be fixed or raised and lowered without actuating the primary fold cylinders.

Improving technology allows for faster planting speeds, which in turn generates greater draft forces on the tool bar components, including the wings. Excessive draft twist can damage the components, thus requiring valuable downtime for maintenance and repair.

It is also desirable to control all of the folding, flexing, and other movements of the wings from the tractor cab for increased efficiency, and minimized or limited time requirements for the operator to exit the cab to adjust the wings and then reenter the tractor cab to continue operations.

Accordingly, a primary objective of the present invention is the provision of an improved agricultural stacker tool bar.

Another objective of the present invention is the provision of an agricultural tool bar having folding wings with improved structural and functional features.

A further objective of the present invention is the provision of a stacker tool bar having hydraulic fold cylinders positioned to maximize or increase usable space on the tool bar, and minimize hydraulic cylinder sizes through orientations having increased mechanical advantages.

A further objective of the present invention is the provision of a stacker tool bar having folding wings with hydraulic flex cylinders to control the floating of the wings doing various ground contours.

Still another objective of the present invention is the provision of an improved stacker tool bar having folding wings with stop and twist limits for the wings to minimize wear, maintenance, and repair while allowing fast planting speeds.

Yet another objective of the present invention is the provision of a stack tool bar having radio controlled hydraulic functions for efficiency and time savings in folding and unfolding the tool bar wings.

A further objective of the present invention is the provision of a folding agricultural tool bar which can be used for narrow row planting without interference by seed boxes during the folding and unfolding processes.

Another objective of the present invention is the provision of an agricultural tool bar with folding outer wings having a positive coupling with the center frame when the wings are in the use position to provide proper positioning and to limit twisting of the wing during planting.

A further objective of the present invention the provision of an agricultural tool bar having folding lateral wings which can be adjusted for accurate positioning.

Still another objective of the present invention is the provision of a method of folding left and right outer wings on an agricultural tool bar using a first pair of hydraulic cylinders which are extended to raise the wings and retracted to lower the wings.

Another objective of the present invention is the provision of a method of folding outer wings of an agricultural tool bar between a lowered field position and a raised transport position utilizing two pairs of hydraulic cylinders, with the first pair pivoting the wings to an upwardly inclined position and the second pair of cylinders folding the wings inwardly to the transport position.

Another objective of the present invention is the provision of an agricultural tool bar having folding wings which is economical to manufacture, and durable and safe in use.

These and other objectives will come apparent from the following description of the invention.

SUMMARY OF THE INVENTION

An agricultural tool bar is provided with left and right folding wings on the outer ends of a central frame. The wings are connected to the central frame by left and right folding arms. A first set of hydraulic cylinders are connected between the central frame in the folding arms and reside beneath the folding arms. A second set of hydraulic cylinders extend between the folding arms and the wings. To move from the field position to the transport position, the second set of cylinders is actuated to incline the wings upwardly, which provides clearance, without interference, for seed boxes or other equipment mounted on the center frame and on the wings. Then, the primary cylinders are extended to push the folding arms upwardly from the inclined position and thereby raise the wings to a substantially vertical transport position. The method is reversed for lowering the wings to the field use position. A male and female coupling is provided on the mating ends of the central frame and the wings to provide accurate positioning and to minimize draft twisting on the wings during planting operations. A threaded shaft allows adjustability of the wings in the use position so that the coupling is properly aligned. A control valve is provided for the secondary cylinders, such that the cylinders can be selectively deactivated to allow the wings to float or flex in the field and later activate for raising the wings to the inclined position prior to complete folding to the transport position. Both sets of the hydraulic cylinders can be controlled remotely from the cab of the tractor pulling the tool bar.

BRIEF DESCRIPTION OF THE DRAWINGS

More particularly, FIG. 1 is a front perspective view of the stacker tool bar in the use position, without any planter equipment (such as row units with seed hoppers) mounted thereon.

FIG. 2 is a rear elevation view of the stacker tool bar.

FIG. 3 is a front perspective view of the stacker tool bar with wings folded up in the transport position (and with some of the vacuum tubes for seed planting removed for clarity).

FIG. 4 is a front elevation view of the stacker tool bar shown in FIG. 3.

FIG. 14 is a rear elevation view showing the wing in the field use position with closely spaced row units mounted on the center frame and the wing.

DETAILED DESCRIPTION OF THE INVENTION

Figure 1:
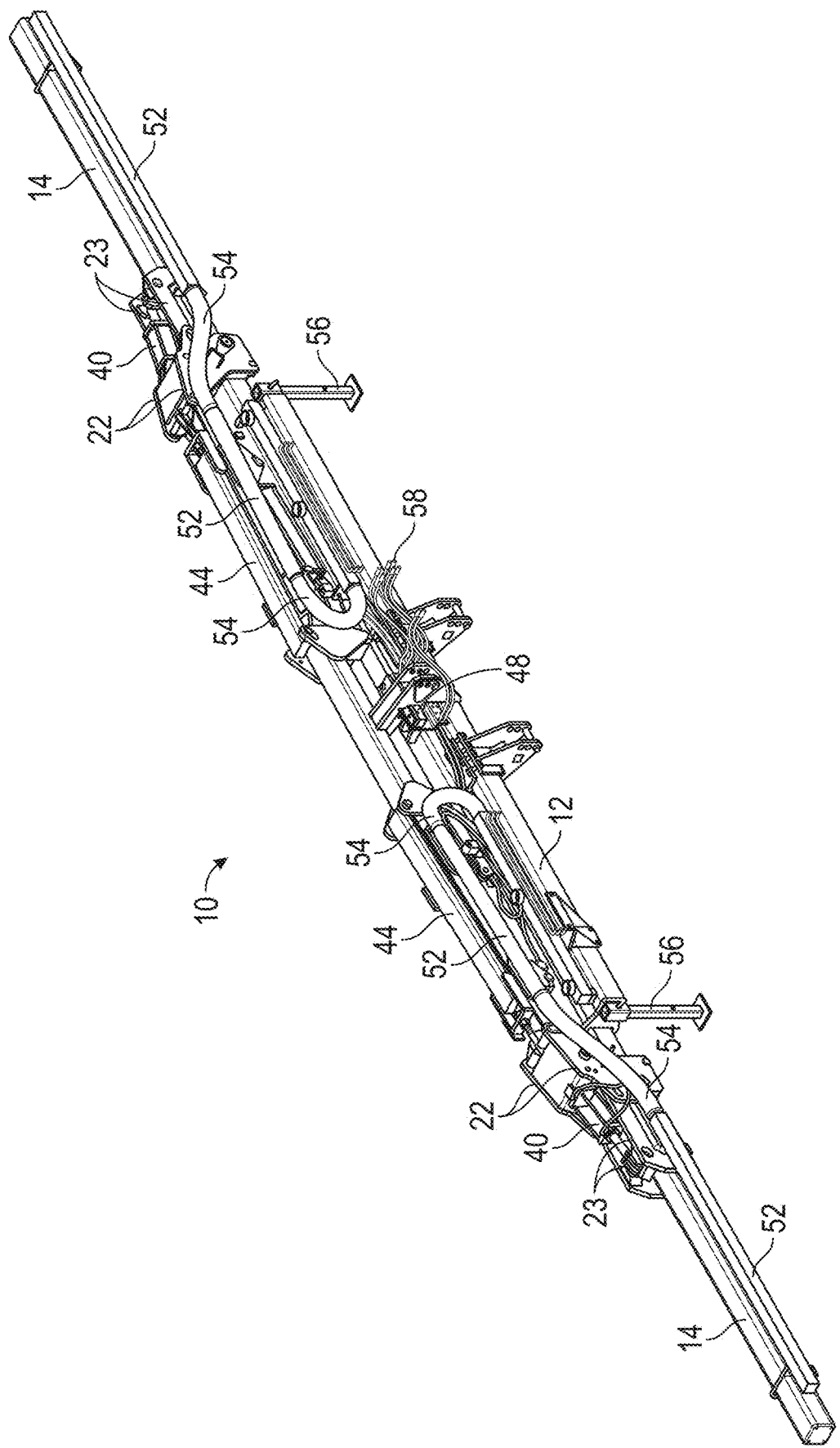
FIGS. 1-2 show the stacker tool bar of the present invention with the wings unfolded downwardly to a field use position.
Figure 2:
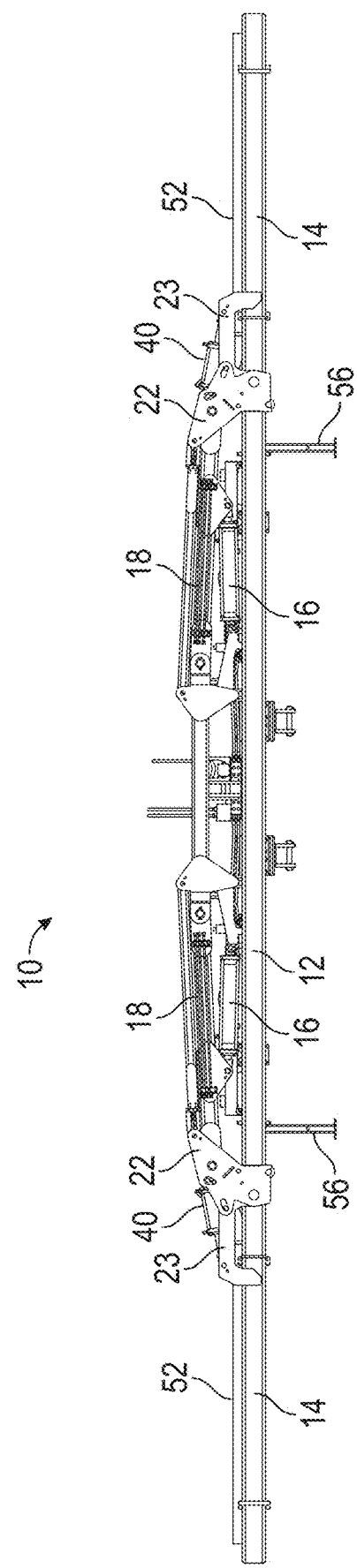
Figure 3:
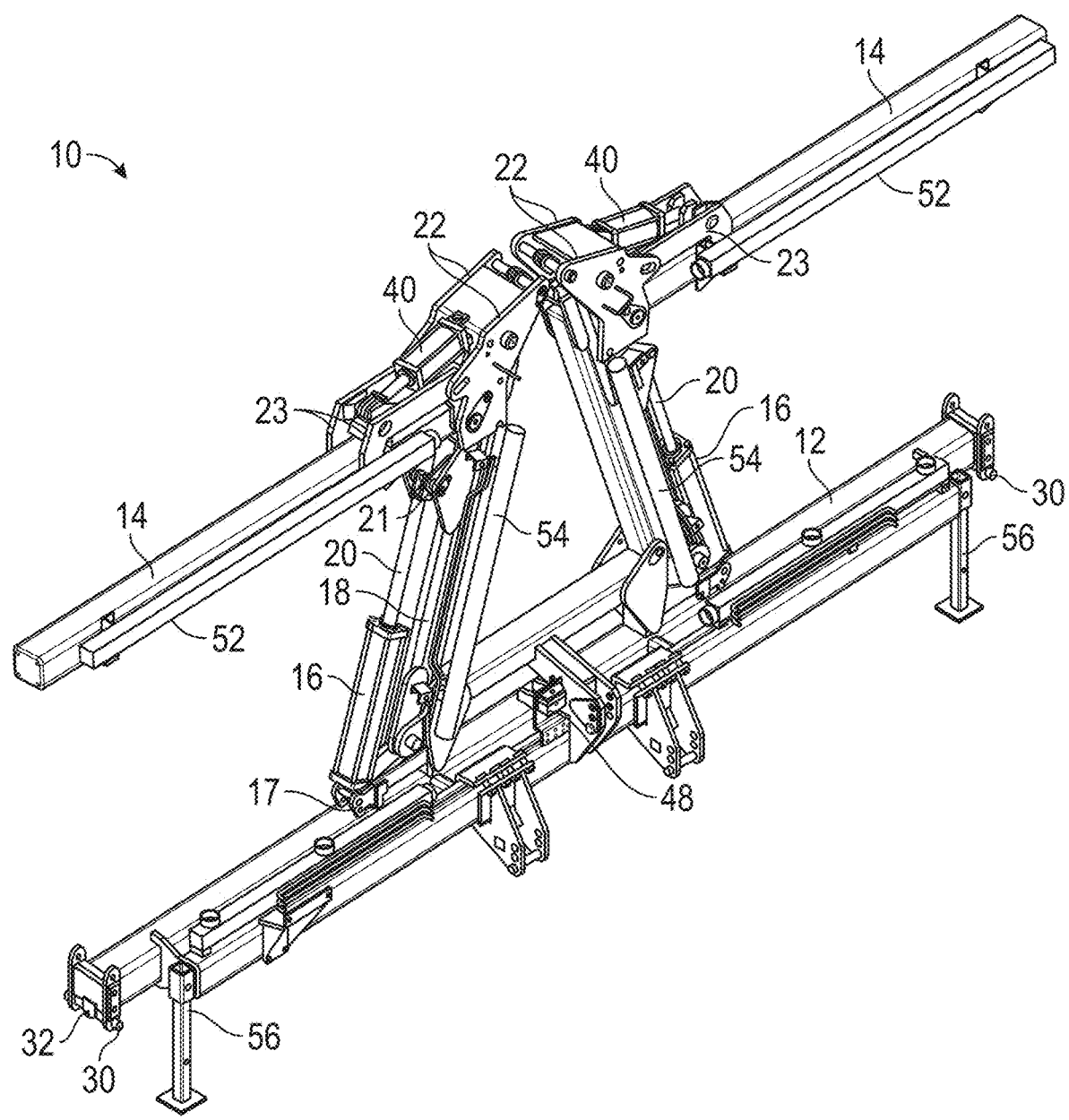
FIGS. 3-4 show the stacker tool bar with the wings folded upwardly in the transport position.
Figure 4:
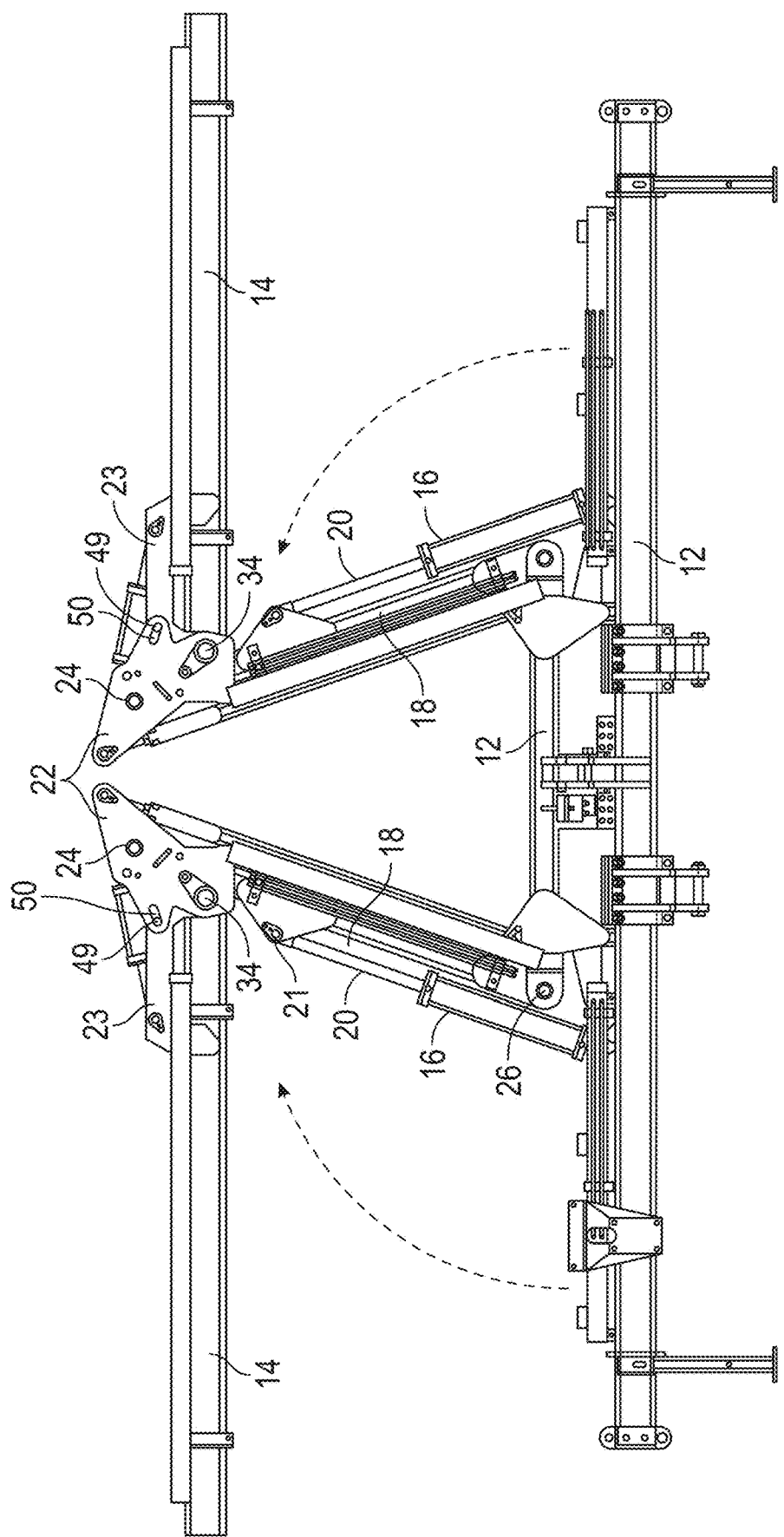
Figure 5:
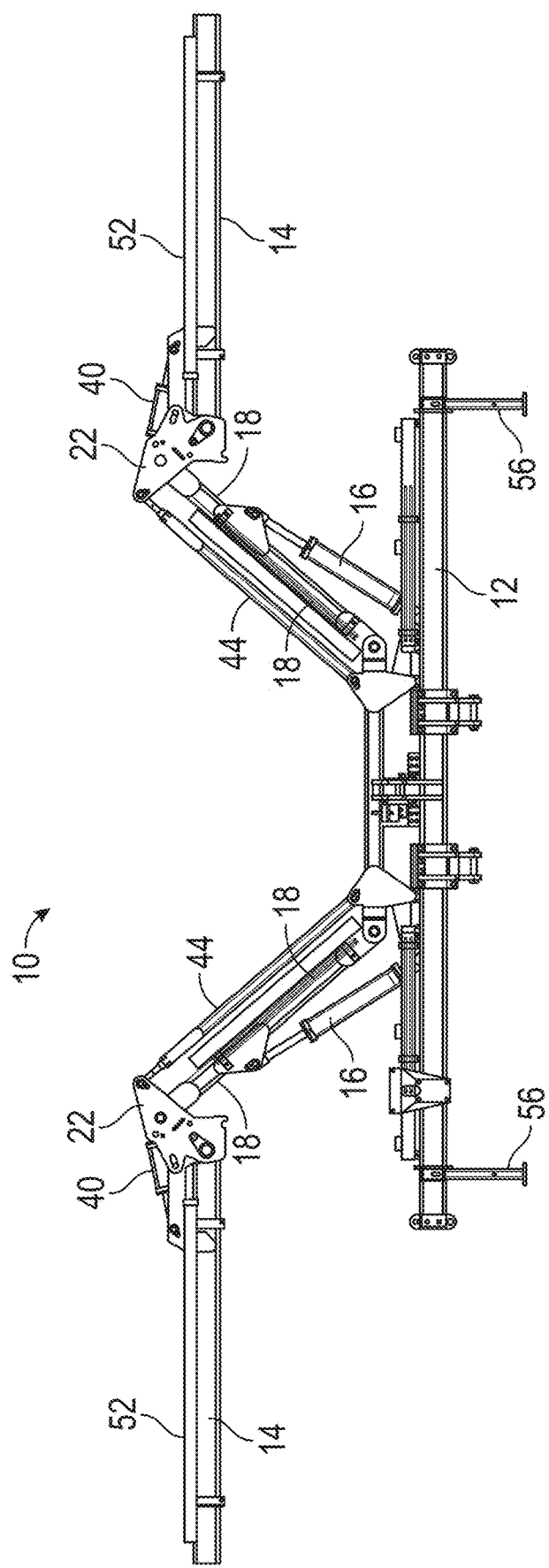
FIG. 5 is a front elevation view of the stacker tool bar shown in FIG. 3.

The stacker toolbar 10 of the present invention includes a center frame assembly 12 and opposite folding wings 14. The wings 14 are movable between a lowered field use position, as shown in FIGS. 1-2, and a raised transport position, as shown in FIGS. 3-4. A pair of hydraulic cylinders 16 can be actuated to fold and unfold the wings 14.

Since the wings 14 are mirror images of one another, the following description for one wing also applies to the other wing.

As best seen in FIG. 3, a fold arm 18 has an outer end pivotally connected to the inner end of the wing 14, and an inner end pivotally connected to the center frame assembly 12. The hydraulic fold cylinder 16 is pivotally connected by a pin 17 at its fixed end to the center frame 12, while the rod 20 of the cylinder 16 is pivotally connected by a pin 21 to the fold arm 18, as best seen in FIGS. 3 and 4. This position of the fold cylinder 16 on top of the center frame 12 and beneath the fold arm 18 provides a larger, unobstructed open area between the fold arms 18 when the wings 14 are folded up to the transport position, as seen in FIG. 4. This open area between the fold arms 18 allows other structural components to be mounted on the center frame 12 without interference by the folding wings 14. For example, a bulk seed fill system may be installed on the center frame 12 between the folded arms 18, which will position the bulk seed system closer to the tractor, thus reducing the lift load on the tractor/tool bar three-point hitch assemblies, while helping to eliminate the need for undesirable lift assist wheel assemblies on the tool bar. The position of the fold cylinders 16 on the bottom of the fold arm also increases the lifting capacity of the cylinder, since the cylinder can push more than it can pull. This extra lifting capacity is beneficial due to the larger load requirements which are becoming more common on tool bars.

Figure 8:
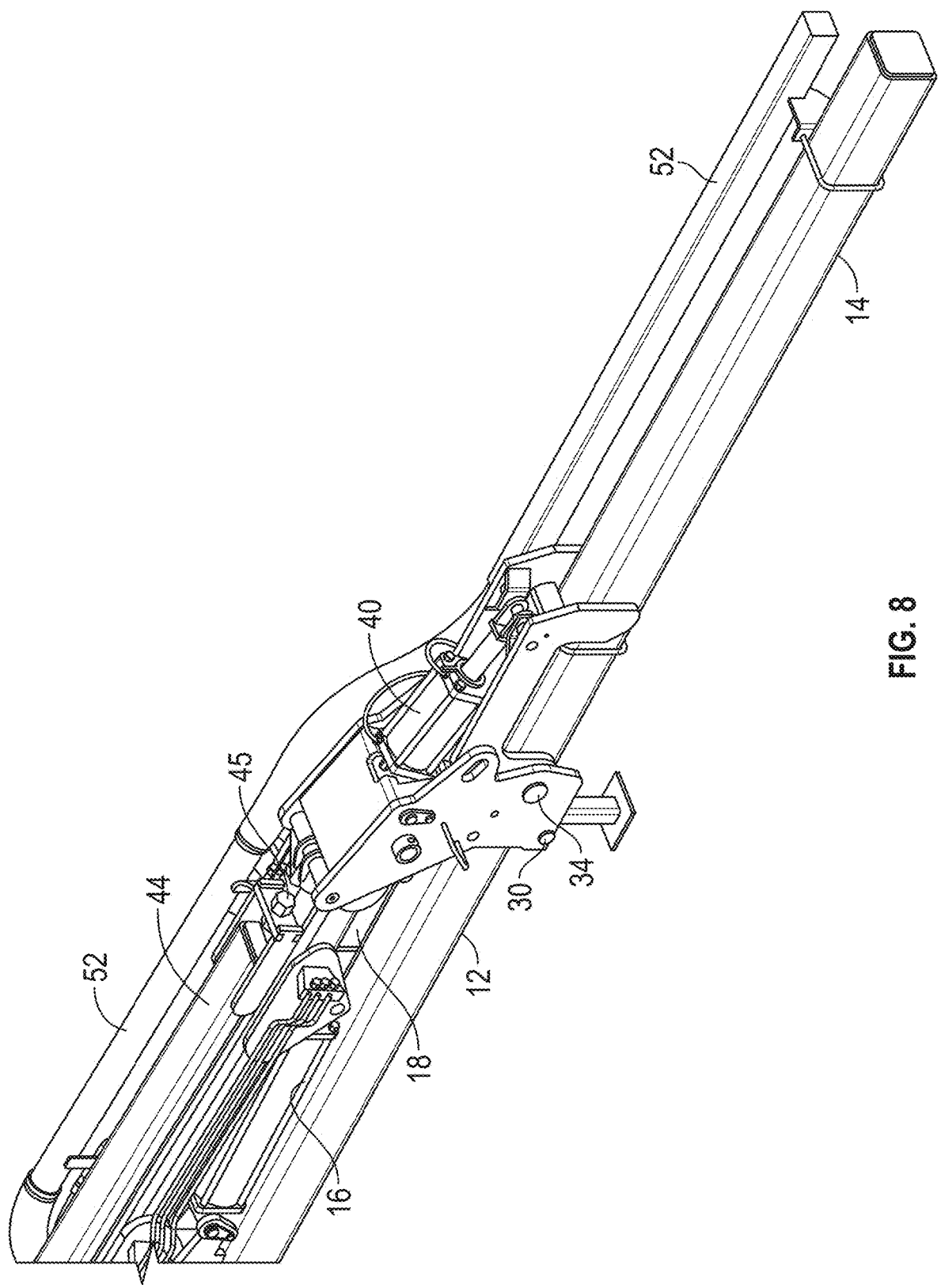
FIG. 8 is a rear perspective view of one end of the stacker toolbar in the use position.
Figure 9:
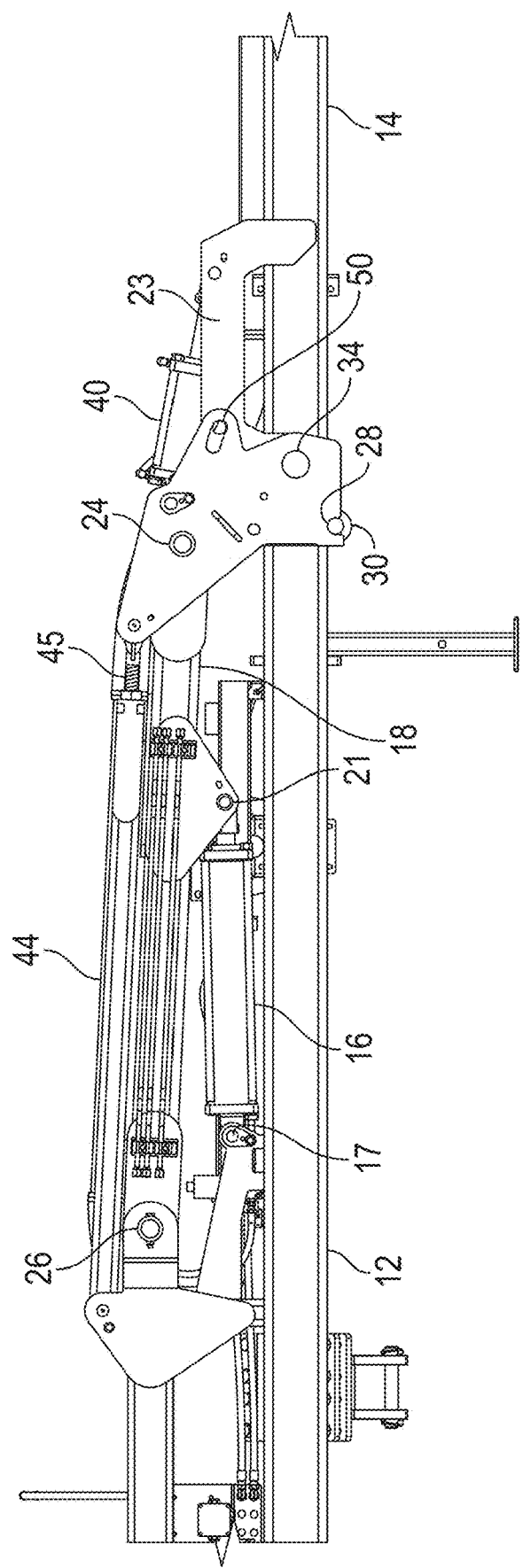
FIG. 9 is a rear elevation view showing a portion of the center frame and one wing in the use position.
Figure 10:
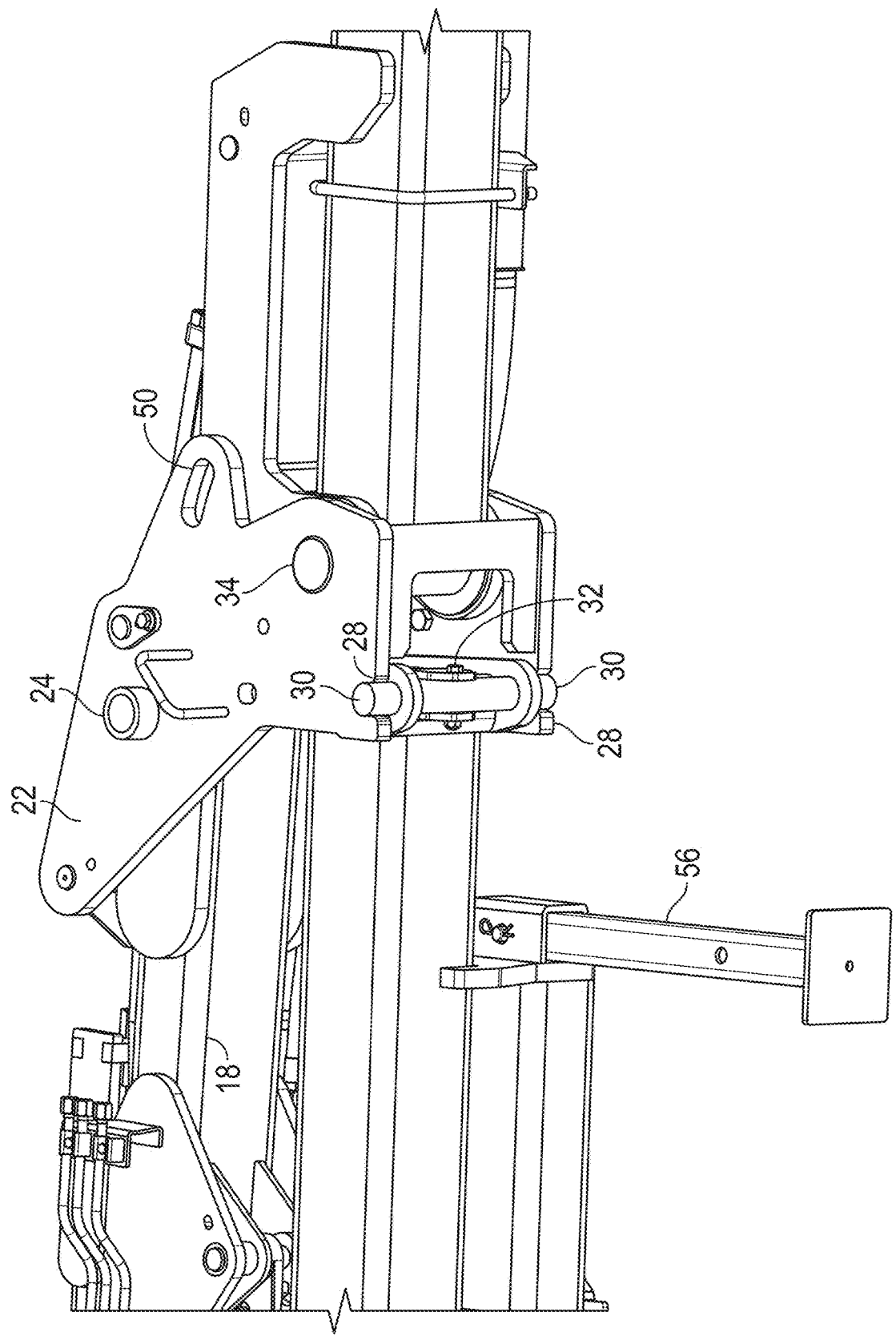
FIG. 10 is an enlarged perspective view from beneath the stacker toolbar showing the stop and flex limit structure of the stacker tool bar.

As best shown in FIGS. 8-10, the wing 14 is connected to the fold arm 18 by a pair of mounting plates 22 residing on opposite sides of the wing 14 and the arm 18. A shaft 24 extends through the plates 22 to define the pivot axis for the wing 14. As shown in FIG. 9, the fold arm 18 is pivotally mounted to the center frame 12 by a second shaft 26 defining an inner pivot axis for the fold arm 18. As further shown in FIG. 9, when the wing 14 is in the unfolded use position, the fold arm 18 extends slightly downwardly from the inner pivot axis 26 to the outer pivot axis 24, while the fold cylinder 16 extends slightly upwardly from the fixed end axis 17 to the connection axis 21 of the rod 20 to the fold arm 18. In other words, the axis 26 is at a higher elevation than the axis 24, and the cylinder axis 17 is at a lower elevation than the rod axis 21, when the wing 14 is unfolded down. The opposite inclinations of the cylinder 16 and the fold arm 18 provide a mechanical advantage when the rod 20 is being extended or pushed to fold the wing 14 from the use position to the transport position. The downward incline of the fold arm 18 also provides a mechanical advantage with the fold cylinder 16 to hold or urge the wing 14 downwardly in the field position.

The plates 22 each include a lower notch 28 to receive a shaft or stop pin 30 at the bottom outer end of the center frame 12, as best seen in FIG. 10. The mounting plates 22 and the receipt of the stop shaft 30 in the notches 28 of the plate 22 provides a male/female coupling to assure that the wing 14 is properly positioned and centered for use in the field. The pin 30 with the plates 22 also functions to limit and minimize draft twist on the wing 14 during planting operations. The pin 30 is retained on the center frame 12 by bolt or clip 32. The pin 30 can be easily removed and replaced if excessive wear occurs.

Figure 6:
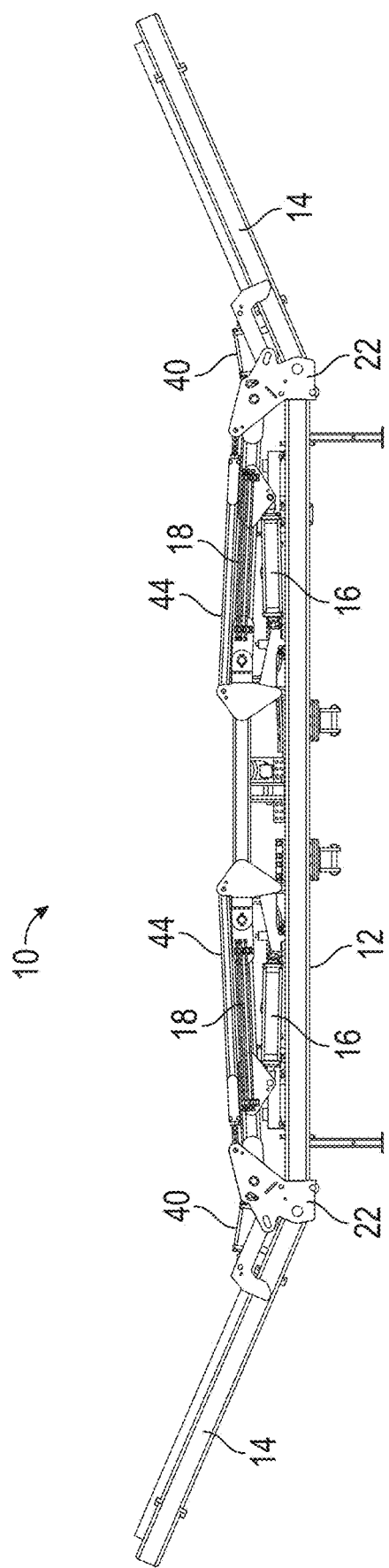
FIG. 6 is a front elevation view of the stacker tool bar showing the wings in an upwardly flexed position.
Figure 7:
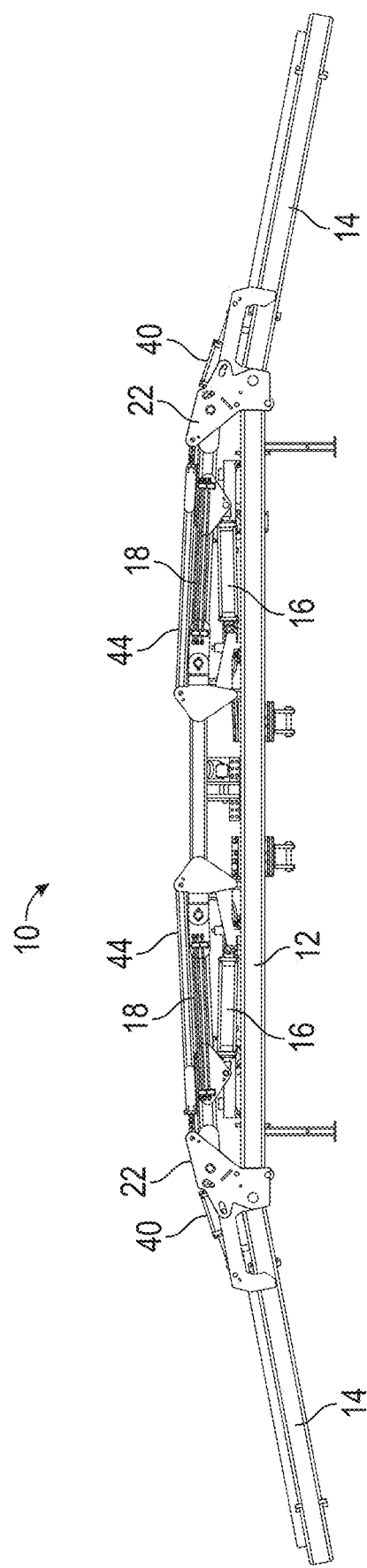
FIG. 7 is a front elevation of the wings in a downwardly flexed position.

Each wing 14 also has the ability to flex upwardly and downwardly during use in the field to accommodate uneven or unlevel ground as the tractor traverses the field. As shown in FIG. 10, a pin 34 extending through the plates 22 at the inner ends of the wing 14 and defines a flex pivot axis. Thus, the wings 14 can flex upwardly to approximately 18° (FIG. 6) and downwardly approximately 12° (FIG. 7) about the flex axis 34.

Figure 12:
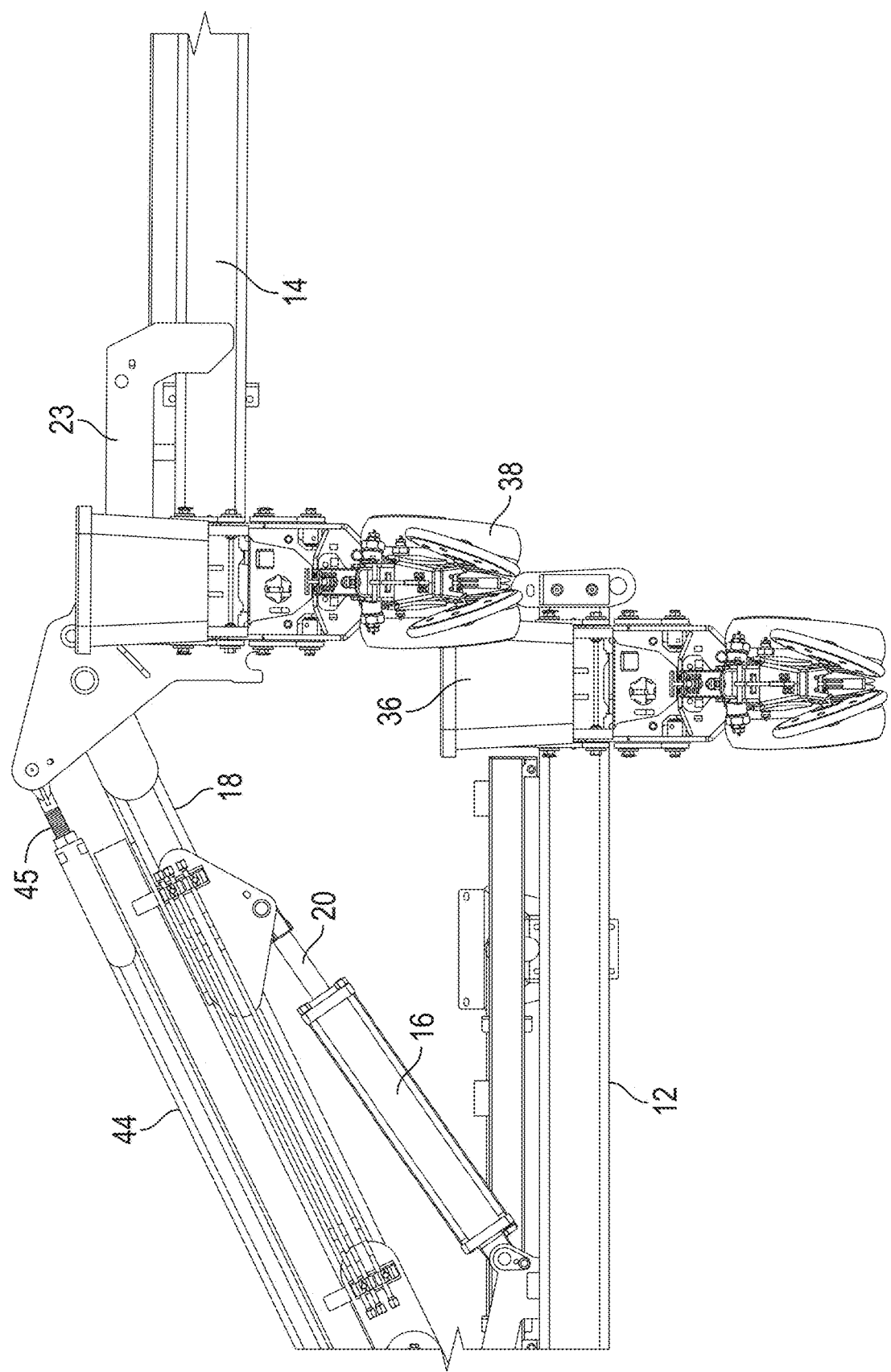
FIG. 12 is a rear elevation view showing interference between narrow row units when the wing is folded in a conventional horizontal manner.
Figure 13:
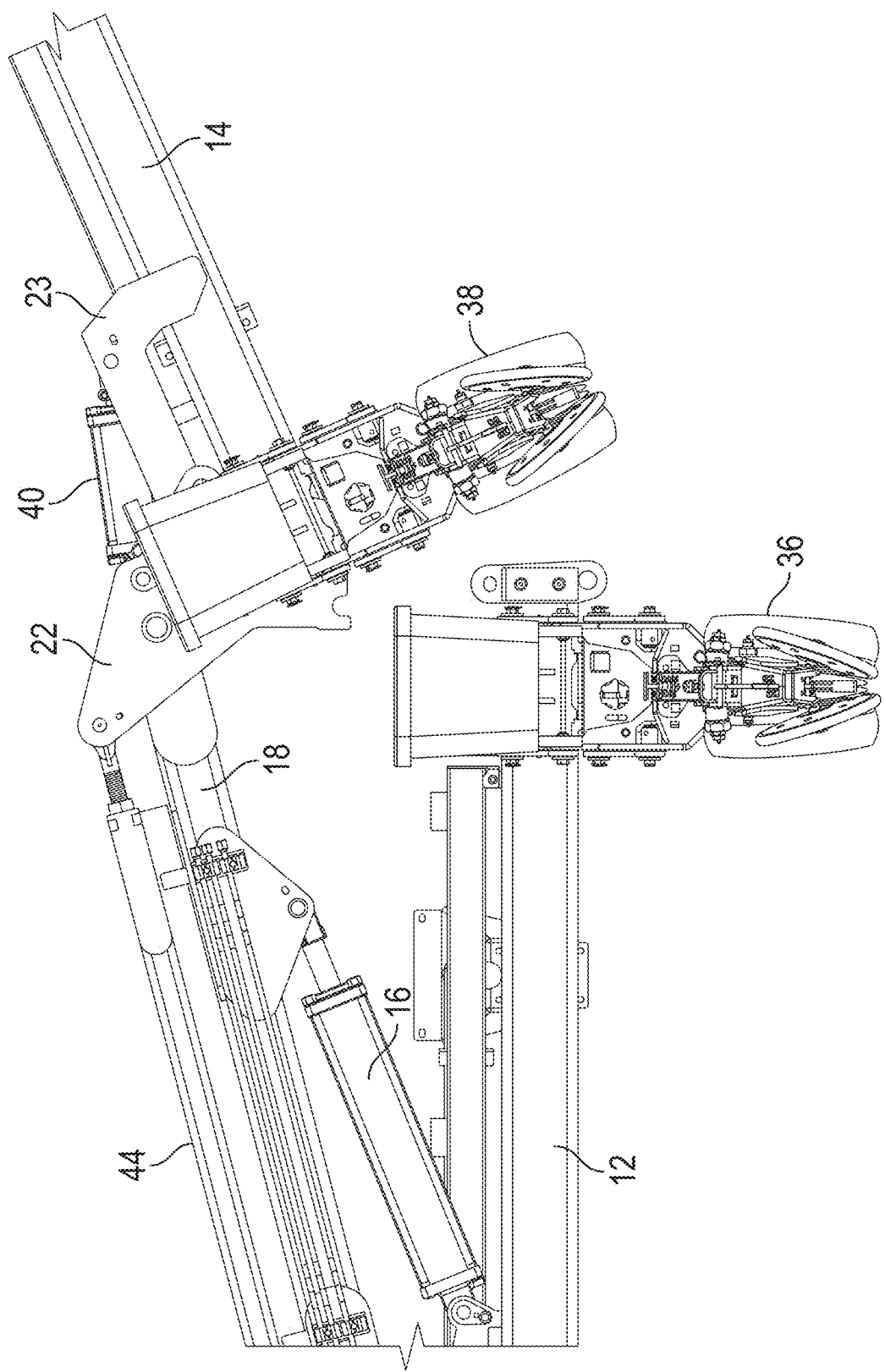
FIG. 13 is a view similar to FIG. 12 showing the wing flexed upwardly for clearance between the narrow row units during wing folding, in accordance to the present invention.

The flex feature provides another benefit during folding and unfolding the wings 14. More particularly, most conventional stacker tool bars raise and lower the wings by maintaining the wings horizontal and parallel to the center frame. This conventional system is typically used for wider row space configurations, such as 30" and 38" row space. However, due to higher yield potential and reduced weed control chemical cost, many farmers are opting to plant soybeans and other crops in narrower rows, such as 15" and 20" row space configurations. These narrow row configurations create interference of the row unit seed boxes 36 on the outer row units of the center section 12 and row unit gauge wheels 38 and disc openers on the inner end of the wing 14. See FIG. 12. In order to overcome this interference, each wing 14 is provided with a hydraulic cylinder 40 connected to the mounting plates 22 and to wing plates 23. This hydraulic flex cylinder 40 can be actuated to pivot the wing 14 upwardly about the flex pin axis 34, such that the gauge wheels 38 on the row unit on the inner end of the wing 14 will clear the seed box 36 on the row unit on the outer end of the center frame 12, when the wing 14 is folded upwardly to the transport position and downwardly to the use position, as shown in FIG. 13. FIG. 14 shows the wing 14 in a transport position, with the narrowly spaced row units 42.

A wing adjustor arm 48 is provided between the mounting bracket 22 and the center frame 12. The adjustor arm includes a threaded shaft 45 (FIG. 8) which can be turned to fine tune positioning of the wing 14 (similar to a turn buckle), particularly when unfolded to the use position for accurate positioning of the notches 28 of the plates 22 on the pin 30.

Figure 11:
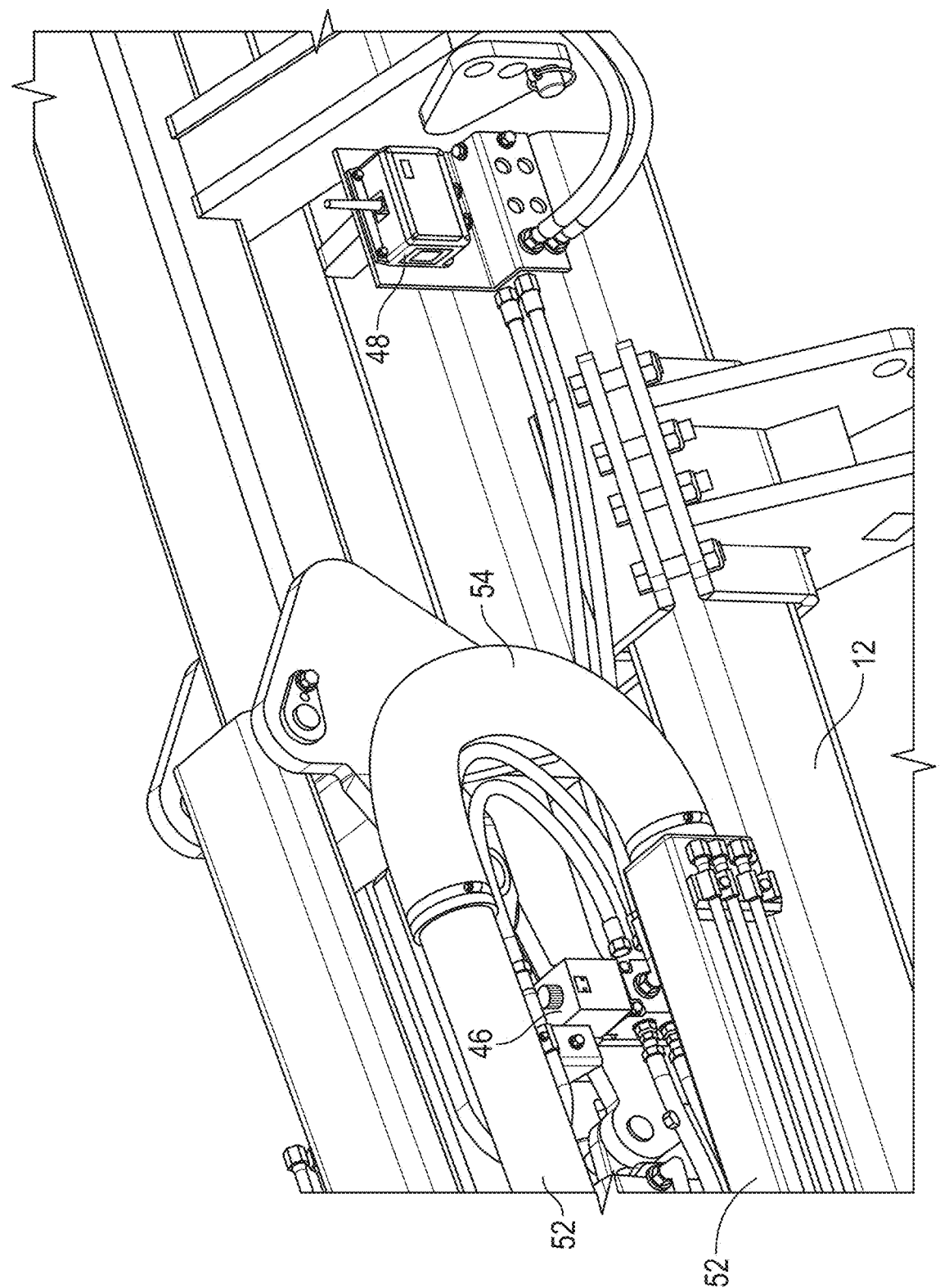
FIG. 11 is an upper perspective view showing control components for the stacker tool bar of the present invention.

The stacked tool bar 10 of the present invention also includes a selector valve 46 (FIG. 11) which can selectively actuated or deactuated to control the hydraulic flex cylinder 40. When the valve 46 is turned off, the wing 14 is free to float. When the valve 44 is actuated, hydraulic fluid may be provided to the flex cylinder 40 to extend and retract the cylinder rod so as to flex the wing 14 upwardly and downwardly, or to lock the cylinder 40 against flexing by maintaining constant fluid pressure within the cylinder 40.

In the preferred embodiment, the stacker tool bar 10 also includes a radio-controlled receiver 48 (FIG. 11) to control the hydraulic functions of the fold cylinders 16 and flex cylinders 40. An SCV in the tractor controls fluid that flows the hydraulic hoses, with remote wireless instructions from the operator in the cab, via the receiver 48. The receiver 46 eliminates the need for a wire harness from the tractor cab to the tool bar 10.

Once the unfolding process is completed, and the mounting plates 22 are resting on the stop/anti-twist shaft or pin 30, the tractor hydraulic remote SCV is placed in a float position to allow the rod of the wing flex cylinder 40 to float back and forth and allow the wing to flex up and down to follow the ground contour. Alternatively, the wing 14 can be held rigid to maintain a parallel relationship between the wings 14 and the center frame 12 by leaving the tractor remote (SCV) in the centered or non-float position.

When there are narrow row units 42 on the center frame 12 and the wing 14, the folding sequence from the use position to the transport position requires the wing flex cylinder 40 to retract first to flex the wing to its maximum angle, and then wing fold cylinder 16 extends to raise the wing fold arm 18 and the attached wing 14 without interference between the seed box 36 and the gauge wheels 38. The process is reversed when lowering the wing 14 from the transport position to the field position. This hydraulic sequence is controlled by the operator via radio controlled hydraulic selector valve 46 mounted on the tool bar and a cab mounted radio control pendant sending signals to the receiver 48.

When the tractor approaches the end of the field, the wing flex cylinder 40 can be retracted by the tractor SCV so as to lift the wing upwardly, which disables the flex function. After the field turn is completed, the flex cylinder 40 can be extended by the SCV and restore the floating function of the wing 14.

During transportation, with the wings 14 folded upwardly, a pin 49 can be inserted through a slotted hole 50 (FIGS. 4 and 10) in the mounting plates 22 and wing plates 23 in order to keep the wing 14 from flexing downwardly.

It is understood that the drawings show additional structures on the toolbar 10 which are not a part of the present invention, but which are part of the overall toolbar assembly used during planting and other operations. For example, vacuum tubes 52 and hoses 54 provide operational air to the seed planters of the row units mounted on the toolbar 10. (The hoses 54 have been removed in FIGS. 3-7 for simplification of the drawings). Also, a pair of retractable legs 56 are provided on the center frame 12 for use when the tool bar 10 is disconnected from the tractor. The legs 56 are raised or removed the toolbar 10 is mounted to the three-point hitch of the tractor. The hydraulic hoses or lines 58 connect the cylinders 16 and 40 to the tractor hydraulic fluid tank (not shown).

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed:
1. An agricultural tool bar, comprising:
a center frame assembly;
left and right fold arms, each having an inner end pivotally attached to the center frame assembly and each having an outer end;
opposite left and right wings each having an inner end pivotally connected to the outer end of the left and right fold arm, respectively; which pivot between a lowered use position and a raised transport position;
left and right hydraulic fold cylinders each having inner ends connected to the center frame assembly and outer ends connected adjacent the outer ends of the left and right fold arms, respectively, and being actuable to fold and unfold the left and right fold arms between a raised transport position and a lowered field position;
left and right hydraulic flex cylinders connected to the left and right fold arms and to the left and right wings, respectively, to move the wings between a lowered use position and an upwardly inclined position relative to the fold arms; and
the left and right wings reside above the left and right fold arms, respectively, when the fold arms are in the transport position.
2. The agricultural tool bar of claim 1 further comprising left and right control valves operatively connected to the left and right flex cylinders, respectively, to selectively allow the wings to float, to be fixed, or to be raised and lowered by the flex cylinders.
3. The agricultural tool bar of claim 1 further comprising a stop member between each fold arm and the center frame assembly when the wings are in the use position.
4. The agricultural tool bar of claim 1 wherein the fold cylinders extend to move the fold arms to the transport position and retract to move the fold arms to the field position.
5. The agricultural tool bar of claim 1 wherein the flex cylinders retract to move the wings to the inclined position and extend to move the wings to the use position.

* * * * *